(12) United States Patent
Hirai et al.

(10) Patent No.: US 9,964,206 B2
(45) Date of Patent: May 8, 2018

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Nobuyuki Hirai, Anjo (JP); Masamichi Yamaguchi, Anjo (JP); Yoshimitsu Hyodo, Nishio (JP); Kenichi Tsuchida, Nishio (JP); Naoyuki Fukaya, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 292 days.

(21) Appl. No.: 15/021,883

(22) PCT Filed: Sep. 30, 2014

(86) PCT No.: PCT/JP2014/076206
§ 371 (c)(1),
(2) Date: Mar. 14, 2016

(87) PCT Pub. No.: WO2015/046607
PCT Pub. Date: Apr. 2, 2015

(65) Prior Publication Data
US 2016/0230879 A1    Aug. 11, 2016

(30) Foreign Application Priority Data

Sep. 30, 2013 (JP) .................................. 2013-205652

(51) Int. Cl.
*F16H 61/12* (2010.01)
*F16H 61/02* (2006.01)
(Continued)

(52) U.S. Cl.
CPC ......... *F16H 61/0267* (2013.01); *F16H 3/666* (2013.01); *F16H 61/0021* (2013.01);
(Continued)

(58) Field of Classification Search
CPC .. F16H 61/0267; F16H 3/666; F16H 61/0021; F16H 61/0206; F16H 61/12; F16H 61/686
See application file for complete search history.

(56) References Cited

U.S. PATENT DOCUMENTS 4,987,798 A * 1/1991 Funahashi ............... F16H 61/10
                                                    477/119
5,086,672 A * 2/1992 Kato ....................... F16H 61/16
                                                    477/126
(Continued)

FOREIGN PATENT DOCUMENTS

JP           H02-4057 U      1/1990
JP        2003-090426 A      3/2003
(Continued)

OTHER PUBLICATIONS

Dec. 22, 2014 Search Report issued in International Patent Application No. PCT/JP2014/076206.

*Primary Examiner* — David M Fenstermacher
(74) *Attorney, Agent, or Firm* — Oliff PLC

(57) ABSTRACT

A hydraulic control device for an automatic transmission, wherein when the first switching valve is switched to the first state while the second switching valve is in the third state, the reverse range pressure applied from the reverse range pressure input port of the second switching valve can be supplied from the first output port to the hydraulic servo for the first friction engagement element via the fourth output port of the second switching valve and the first input port of the first switching valve, and when a shift range is shifted from a neutral range to a reverse range, the second switching valve is in the fourth state, and the first switching valve is switched from the first state to the second state, so that the (Continued)

reverse range pressure applied to the reverse range pressure input port is cut off by the second switching valve.

12 Claims, 4 Drawing Sheets

(51) Int. Cl.
  *F16H 61/686* (2006.01)
  *F16H 61/00* (2006.01)
  *F16H 61/04* (2006.01)
  *F16H 3/66* (2006.01)
(52) U.S. Cl.
  CPC ..... *F16H 61/0206* (2013.01); *F16H 61/0276* (2013.01); *F16H 61/12* (2013.01); *F16H 61/686* (2013.01); *F16H 3/663* (2013.01); *F16H 2061/044* (2013.01); *F16H 2061/0485* (2013.01); *F16H 2061/1288* (2013.01); *F16H 2200/006* (2013.01); *F16H 2200/201* (2013.01); *F16H 2200/2023* (2013.01); *F16H 2200/2046* (2013.01); *F16H 2200/2048* (2013.01); *F16H 2200/2066* (2013.01); *F16H 2200/2082* (2013.01)

(56) References Cited

U.S. PATENT DOCUMENTS

| | | | |
|---|---|---|---|
| 8,088,039 B2 * | 1/2012 | Nishimine | F16H 61/0206 477/131 |
| 8,435,159 B2 * | 5/2013 | Shimizu | F16H 61/0206 477/130 |
| 8,447,490 B2 * | 5/2013 | Yoshimizu | F16H 61/12 477/143 |
| 8,632,433 B2 | 1/2014 | Shimizu et al. | |
| 2009/0280953 A1 | 11/2009 | Nishimine et al. | |

FOREIGN PATENT DOCUMENTS

| | | |
|---|---|---|
| JP | 2010-513798 A | 4/2010 |
| JP | 2011-214644 A | 10/2011 |

* cited by examiner

FIG.2

|   | C-1 | C-2 | C-3 | C-4 | B-1 | B-2 | F-1 |
|---|---|---|---|---|---|---|---|
| P |   |   |   |   |   |   |   |
| R |   |   | ○ |   |   | ○ |   |
| N |   |   |   |   |   |   |   |
| 1st | ○ |   |   |   |   | (○) | ○ |
| 2nd | ○ |   |   |   | ○ |   |   |
| 3rd | ○ |   | ○ |   |   |   |   |
| 4th | ○ |   |   | ○ |   |   |   |
| 5th | ○ | ○ |   |   |   |   |   |
| 6th |   | ○ |   | ○ |   |   |   |
| 7th |   | ○ | ○ |   |   |   |   |
| 8th |   | ○ |   |   | ○ |   |   |

*(○): ENGINE BRAKE IN OPERATION.

HYDRAULIC CONTROL DEVICE FOR AUTOMATIC TRANSMISSION

BACKGROUND

The present disclosure relates to hydraulic control devices for automatic transmissions that are mounted on, e.g., vehicles such as an automobile.

Conventionally, a hydraulic control device for an automatic transmission is proposed which uses two valves to supply an oil pressure to hydraulic servos for a clutch C-3 and a brake B-2 forming a reverse speed and which can form the reverse speed even in case of a failure in which one of the valves is fixed to a reverse inhibiting state (see Japanese Patent Application Publication No. 2011-214644).

More specifically, in this hydraulic control device, even if a B2 apply control valve cannot be changed from the reverse inhibiting state, a reverse range pressure can be supplied to the hydraulic servos for the clutch C-3 and the brake B-2 by switching a distribution valve to a position shown in the right half thereof in FIG. 1 of Japanese Patent Application Publication No. 2011-214644.

SUMMARY

In recent years, in order to achieve improved response to shifting of the shift range from a neutral range (N range) to a reverse range (R range), it has been proposed to supply a predetermined oil pressure to a hydraulic servo for one of engagement elements that form a reverse speed when in the N range.

In such a hydraulic control device as described in Japanese Patent Application Publication No. 2011-214644, however, if a low oil pressure is supplied to, e.g., the hydraulic servo for the brake B-2 when in the neutral range in order to perform such control, and the position of the distribution valve is not switched quickly enough or the reverse range pressure is generated early when the shift range is shifted from the N range to the R range, the reverse range pressure that cannot be regulated may be supplied to the hydraulic servo for the clutch C-3 through a path that is used in case of the failure. In this case, even a low oil pressure may cause the clutch C-3 to be engaged by the reverse range pressure, since efforts have recently been made to reduce the size of a hydraulic oil chamber of the clutch C-3 etc. as much as possible in order to achieve improved response.

Accordingly, a hydraulic control device for an automatic transmission is desired which can achieve improved response to shifting from N to R and ensure that a reverse speed is formed even in case of a failure and which causes less shift shock in a vehicle.

According to an exemplary aspect of the present disclosure, a hydraulic control device for an automatic transmission includes a linear solenoid valve that outputs a regulated control pressure; a first switching valve that includes a control pressure input port to which the control pressure can be applied from the linear solenoid valve, a first input port, a first output port connected to a hydraulic servo for a first friction engagement element to be engaged to form a reverse speed, and a second output port, and that can switch between a first state where the control pressure input port communicates with the second output port and the first input port communicates with the first output port and a second state where the control pressure input port communicates with the first output port; a second switching valve that includes a reverse range pressure input port to which a reverse range pressure can be applied, a second input port to which the second output port is connected, a third output port connected to a hydraulic servo for a second friction engagement element to be engaged together with the first friction engagement element to form the reverse speed, and a fourth output port connected to the first input port, and that can switch between a third state where the reverse range pressure input port communicates with the fourth output port and a fourth state where the second input port communicates with the third output port; a first switcher that switches the state of the first switching valve; and a second switcher that switches the state of the second switching valve, wherein when the first switching valve is switched to the first state while the second switching valve is in the third state, the reverse range pressure applied from the reverse range pressure input port of the second switching valve can be supplied from the first output port to the hydraulic servo for the first friction engagement element via the fourth output port of the second switching valve and the first input port of the first switching valve, and when a shift range is shifted from a neutral range to a reverse range, the second switching valve is in the fourth state, and the first switching valve is switched from the first state to the second state, so that the reverse range pressure applied to the reverse range pressure input port is cut off by the second switching valve.

BRIEF DESCRIPTION OF THE DRAWINGS

FIG. 2 is an engagement table of the automatic transmission according to the embodiment.

DETAILED DESCRIPTION OF EMBODIMENTS

Figure 1:
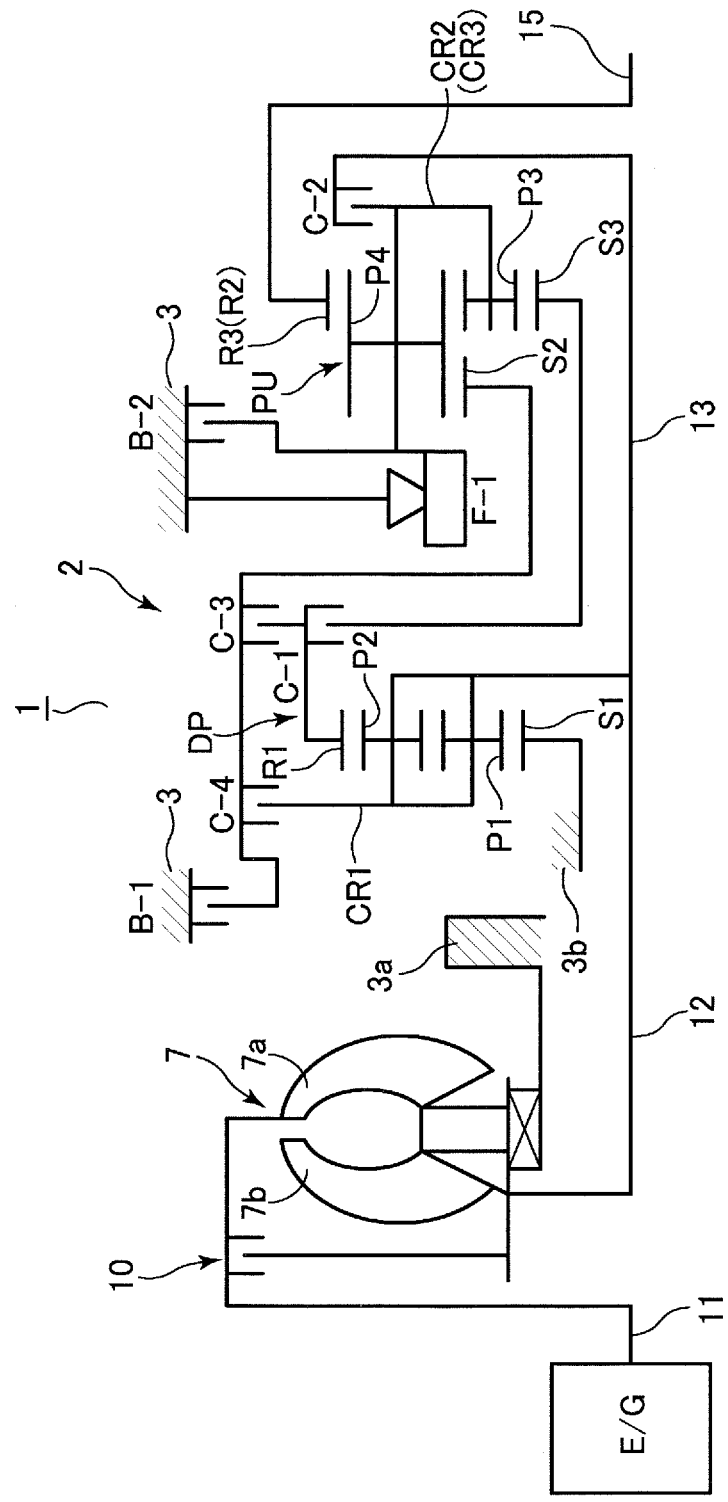
FIG. 1 is a skeleton diagram showing an automatic transmission according to an embodiment.

An embodiment of the present disclosure will be described below with reference to FIGS. 1 to 4D. First, the general configuration of an automatic transmission 1 according to the embodiment will be described with reference to FIG. 1. As shown in FIG. 1, the automatic transmission 1 that is preferably used in, e.g., front engine, rear drive (FR) vehicles has an input shaft 11 of the automatic transmission 1 which can be connected to an engine (driving source). The automatic transmission 1 includes a torque converter 7 and a speed change mechanism 2 which are arranged about the axis direction of the input shaft 11. The automatic transmission 1 can thus shift rotation power that is transmitted from the engine. The present embodiment is applied to the FR vehicles. However, the present disclosure is not limited to this and may be applied to, e.g., front engine, front drive (FF) vehicles.

The torque converter 7 has a pump impeller 7a connected to the input shaft 11 of the automatic transmission 1, and a turbine runner 7b to which rotation of the pump impeller 7a is transmitted via hydraulic fluid. The turbine runner 7b is connected to an input shaft 12 of the speed change mechanism 2 which is placed coaxially with the input shaft 11. The torque converter 7 is provided with a lockup clutch 10. When the lockup clutch 10 is engaged, rotation of the input shaft 11 of the automatic transmission 1 is directly transmitted to the input shaft 12 of the speed change mechanism 2.

The speed change mechanism 2 includes a planetary gear DP and a planetary gear unit PU on the input shaft 12 (and an intermediate shaft 13). The planetary gear DP is what is called a double-pinion planetary gear that has a sun gear S1, a carrier CR1, and a ring gear R1, and that has on the carrier CR1 a pinion P1 meshing with the sun gear S1 and a pinion P2 meshing with the ring gear R1 such that the pinions P1, P2 mesh with each other.

The planetary gear unit PU is what is called a Ravigneaux type planetary gear that has as four rotary elements a sun gear S2, a sun gear S3, a carrier CR2 (CR3), and a ring gear R3 (R2), and that has on the carrier CR2 a long pinion P4 meshing with the sun gear S2 and the ring gear R3 and a short pinion P3 meshing with the long pinion P4 and the sun gear S3 such that the long pinion P4 and the short pinion P3 mesh with each other.

The sun gear S1 of the planetary gear DP is connected to, e.g., a boss portion 3b integrally fixed to a transmission case 3, so that the sun gear S1 is held stationary. The boss portion 3b is extended from an oil pump body 3a. The carrier CR1 is connected to the input shaft 12 so as to make the same rotation (hereinafter referred to as the "input rotation") as that of the input shaft 12. The carrier CR1 is also connected to a fourth clutch C-4. Moreover, the ring gear R1 makes decelerated rotation, which is rotation decelerated from the input rotation, by the sun gear S1 held stationary and the carrier CR1 making the input rotation. The ring gear R1 is connected to a first clutch C-1 and a third clutch C-3. The first clutch C-1 together with other clutches and brakes forms a transmission path.

The sun gear S2 of the planetary gear unit PU is connected to a first brake B-1, so that the sun gear S2 can be held stationary with respect to the transmission case 3. The sun gear S2 is also connected to the fourth clutch C-4 and the third clutch C-3, so that the sun gear S2 can receive the input rotation of the carrier CR1 via the fourth clutch C-4 and can receive the decelerated rotation of the ring gear R1 via the third clutch C-3. The sun gear S3 is connected to the first clutch C-1, so that the sun gear S3 can receive the decelerated rotation of the ring rear R1.

Moreover, the carrier CR2 is connected to a second clutch C-2 that receives the rotation of the input shaft 12 via the intermediate shaft 13, so that the carrier CR2 can receive the input rotation via the second clutch C-2. The carrier CR2 is also connected to a one-way clutch F-1 and a second brake B-2, so that rotation of the carrier CR2 in one direction with respect to the transmission case 3 is restricted via the one-way clutch F-1, and the carrier CR2 can be held stationary via the second brake B-2. The ring gear R3 is connected to an output shaft 15 that outputs rotation to a driving wheel, not shown.

The automatic transmission 1 having the above configuration attains first (1st) to eighth (8th) forward speeds of a drive (D) range (position), one reverse speed (R) of a reverse (R) range, a parking (P) range, and a neutral (N) range by engagement and disengagement of the clutches C-1 to C-4, the brakes B-1, B-2, and the one-way clutch F-1 shown in the skeleton diagram of FIG. 1 according to the combinations shown in the engagement table of FIG. 2.

<Configuration of Hydraulic Control Device>

Next, the configuration of a hydraulic control device 20 for the above automatic transmission 1 will be described based on FIG. 3 especially focusing on the part that controls the clutch (first friction engagement element) C-3 and the brake (second friction engagement element) B-2 which form the reverse speed. In the present embodiment, in order to describe the position of a spool, the position shown in the right half of the spool in the figure is referred to as the "right-half position," and the position shown in the left half of the spool in the figure is referred to as the "left-half position."

Figure 3:
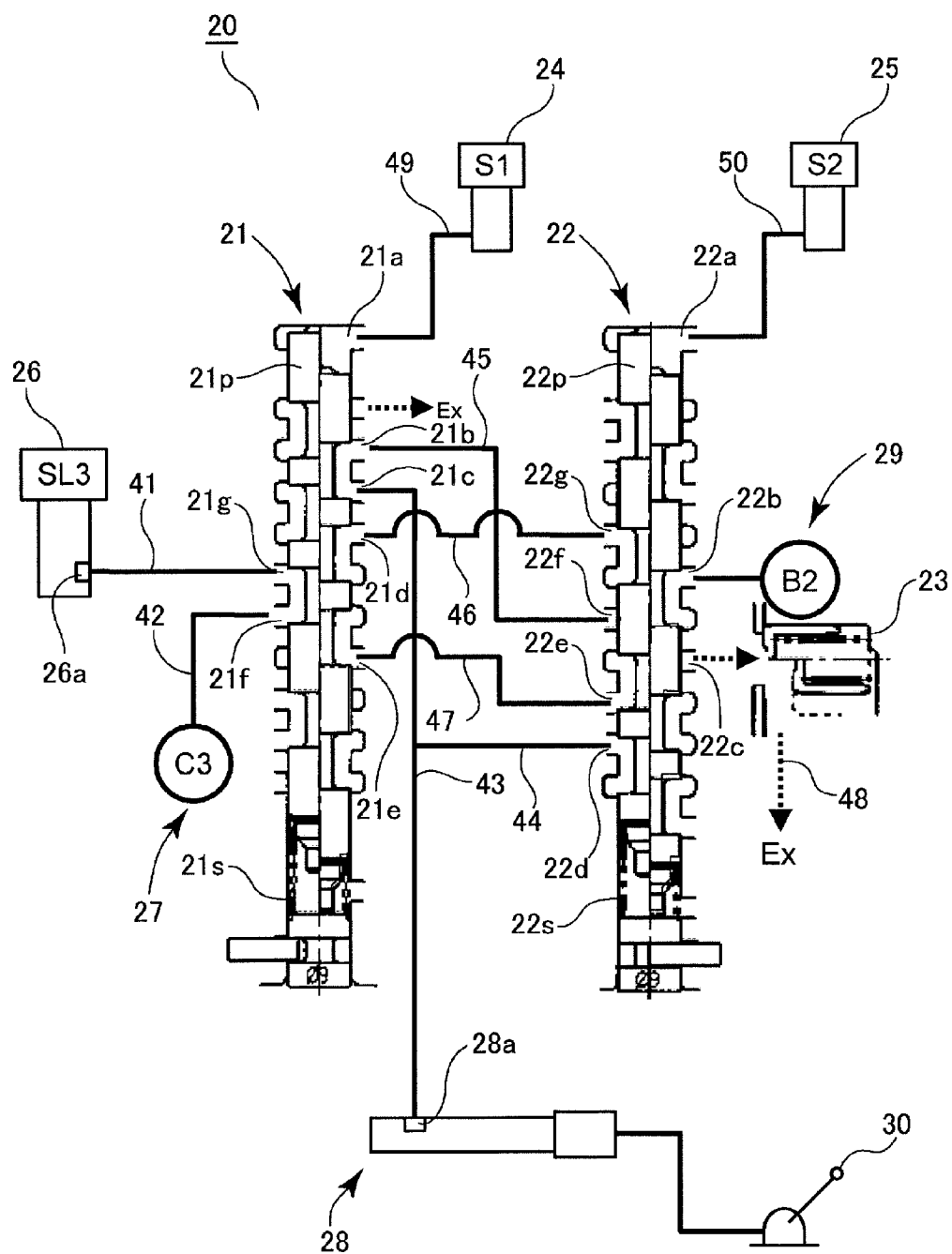
FIG. 3 is a schematic diagram showing a hydraulic control device for the automatic transmission according to the embodiment.

As shown in FIG. 3, the hydraulic control device 20 includes a first switching valve 21 and a second switching valve 22, and includes a manual shift valve 28 as a range pressure generating unit that generates a range pressure (a reverse range pressure $P_{rev}$ and a forward range pressure $P_D$) according to operation of a shift member 30, a linear solenoid valve 26, etc. The hydraulic control device 20 further includes a normally closed first on-off solenoid valve (first switcher) 24 that switches the position (state) of a spool 21p of the first switching valve 21, a normally closed second on-off solenoid valve (second switcher) 25 that switches the position (state) of a spool 22p of the second switching valve 22, etc.

The first switching valve 21 is a distribution valve that distributes a control pressure $P_{SL3}$ from a normally closed linear solenoid valve SL3 to a hydraulic servo 27 for the clutch C-3 and a hydraulic servo 29 for the brake B-2. The clutch C-3 and the brake B-2 therefore share the linear solenoid valve, so that the number of linear solenoid valves that are used for engagement is reduced by one. The second switching valve 22 can output the control pressure $P_{SL3}$, which is output from the first switching valve 21 to the hydraulic servo 29 for the brake B-2, to the hydraulic servo 29 for the brake B-2 and can cut off this control pressure $P_{SL3}$. A reverse inhibiting function, which is a function to inhibit the reverse speed from being formed while the vehicle is traveling forward at a predetermined speed or higher, can thus be achieved by switching the second switching valve 22 to the right-half position.

More specifically, the first switching valve 21 has a spool 21p and a spring 21s that biases the spool 21p upward in the figure, and also has a hydraulic oil chamber 21a provided above the spool 21p in the figure. The first switching valve 21 further has an input port (second reverse range pressure input port) 21c which is connected to a reverse range pressure output port 28a of the manual shift valve 28 via an oil passage 43 and to which a reverse range pressure $P_{rev}$ that cannot be regulated can be applied, an input port (control pressure input port) 21g which is connected to an output port 26a of the linear solenoid valve 26 via an oil passage 41 and to which the control pressure $P_{SL3}$ can be applied, and an input port (first input port) 21e. The first switching valve 21 further has an output port (first output port) 21f connected to the hydraulic servo 27 for the clutch C-3 via an oil passage 42, an output port (second output port) 21d, and an output port (fifth output port) 21b.

Since the hydraulic oil chamber 21a is connected to the first on-off solenoid valve 24 via an oil passage 49, the first switching valve 21 is switched from the left-half position (second state) to the right-half position (first state) when a signal pressure $P_{S1}$ is output from the first on-off solenoid valve 24.

When the first switching valve 21 is in the left-half position, the input port 21g communicates with the output port 21f, and the input port 21c communicates with the output port 21d. When the first switching valve 21 is in the right-half position, the input port 21g communicates with the output port 21d, the input port 21e communicates with the output port 21f, and the input port 21c communicates with the output port 21b.

The second switching valve 22 has the spool 22p and a spring 22s that biases the spool 22p upward in the figure, and also has a hydraulic oil chamber 22a provided above the spool 22p in the figure. The second switching valve 22 further has an input port (first reverse range pressure input port) 22d which is connected to the reverse range pressure output port 28a of the manual shift valve 28 via the oil passage 43 and an oil passage 44 and to which the reverse range pressure $P_{rev}$ that cannot be regulated can be applied, an input port (second input port) 22g to which the output port 21d is connected via an oil passage 46, and an input port (third input port) 22f that communicates with the output port 21b via an oil passage 45. The reverse range pressure $P_{rev}$ can be applied to the input port 22f via the output port 21b. The second switching valve 22 further has an output port (third output port) 22b connected to the hydraulic servo 29 for the brake B-2, an output port (fourth output port) 22e connected to the input port 21e via an oil passage 47, and a drain port 22c connected to a drain circuit 48 to discharge an oil pressure.

Since the hydraulic oil chamber 22a is connected to the second on-off solenoid valve 25 via an oil passage 50, the second switching valve 22 is switched from the left-half position (fourth state) to the right-half position (third state) when a signal pressure $P_{S2}$ is output from the second on-off solenoid valve 25.

When the second switching valve 22 is in the left-half position, the input port 22g communicates with the output port 22b, the output port 22e communicates with the drain port 22c, and the second switching valve 22 cuts off the reverse range pressure $P_{rev}$ received at the input port 22d. When the second switching valve 22 is in the right-half position, the input port 22f communicates with the output port 22b, the input port 22d communicates with the output port 22e, and the input port 22g is blocked. A check valve 23, which is disposed in an intermediate part of the drain circuit 48 and functions as a flow rate limiter that limits the flow rate of oil discharged from the drain port 22c, is connected to the drain port 22c.

<Functions of Hydraulic Control Device>

Functions of the above hydraulic control device 20 will be described based on FIGS. 4A to 4D. It is assumed that, in FIGS. 4A to 4D, each of the first and second switching valves 21, 22 is positioned on the side shown by the filled region of the spool. Those oil passages to which the engagement pressures $P_{SL3}$, $P_{rev}$ are supplied are shown by a solid line, and those oil passages to which no engagement pressure is supplied are shown by a dashed line.

<Operation in Case of Failure>

Figure 4A:
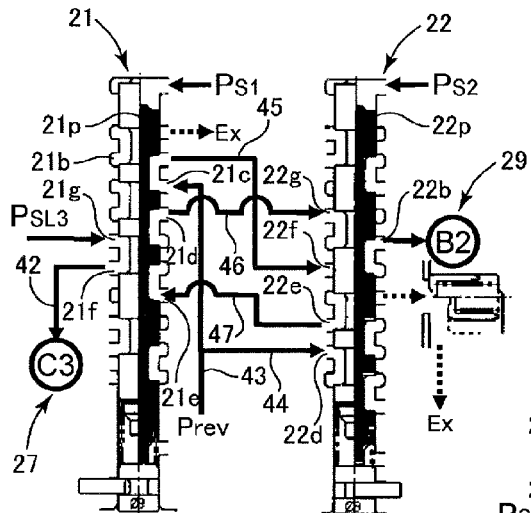
FIG. 4A is a schematic diagram showing the hydraulic control device of FIG. 3 in a state where it is ensured that the reverse speed is formed.

When the vehicle travels forward, the hydraulic control device 20 switches the first switching valve 21 to the left-half position in FIG. 3 and switches the second switching valve 22 to the right-half position in FIG. 3 to cut off supply of an oil pressure to the hydraulic servo 29 for the brake B-2. Namely, the first switching valve 21 blocks communication between the input port 21e of the first switching valve 21 and the output port (fifth output port) 21b of the first switching valve 21 when in the right-half position in FIG. 3, and the second switching valve 22 blocks communication between the input port 22g and the output port 22b when in the right-half position in FIG. 3. Accordingly, when switched to the right-half position while the first switching valve 21 is in the left-half position, the second switching valve 22 is brought into a reverse inhibiting state in which the second switching valve 22 cuts off supply of an oil pressure to the hydraulic servo 29 for the brake B-2. Operation of the hydraulic control device 20 in case of a failure in which the spool 22p cannot be moved when the second switching valve 22 is in the reverse inhibiting state, namely in the right-half position (third state), will be described based on FIG. 4A. As shown in FIG. 4A, in the case where the spool 22p of the second switching valve 22 is fixed to the right-half position due to an on-failure of the second on-off solenoid valve 25, valve sticking, etc., and the reverse speed cannot be formed by a normal method even if the driver selects the R range, the hydraulic control device 20 switches the first switching valve 21 to the right-half position to form the reverse speed.

Since the spool 21p of the first switching valve 21 is in the right-half position, the reverse range $P_{rev}$ applied to the input port 21c via the oil passage 43 is output from the output port 21b to the input port 22f of the second switching valve 22 via the oil passage 45 and is output from the output port 22b to the hydraulic servo 29 for the brake B-2.

The reverse range pressure $P_{rev}$ applied to the input port 22d of the second switching valve 22 via the oil passages 43, 44 is applied from the output port 22e to the input port 21e of the first switching valve 21 via the oil passage 47, and is applied from the output port 21f to the hydraulic servo 27 for the clutch C-3 via the oil passage 42. The brake B-2 and the clutch C-3 are thus engaged by the reverse range $P_{rev}$, and the hydraulic control device 20 can ensure that the reverse speed is formed in case of the failure of the second switching valve 22. In the automatic transmission 1 of the present application, the size of a hydraulic oil chamber of the hydraulic servo 27 for the clutch C-3 is reduced as much as possible.

<Operation in Neutral Range>

Figure 4B:
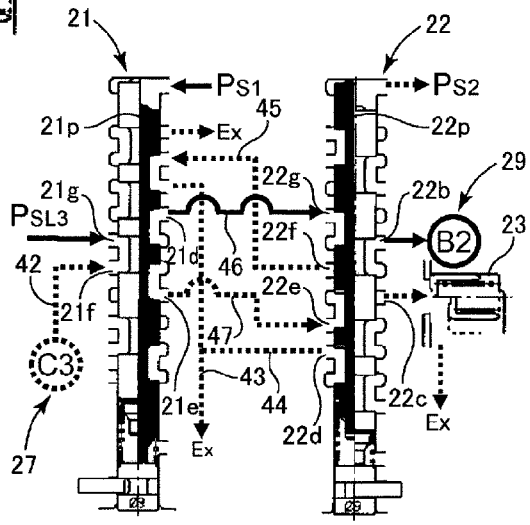
FIG. 4B is a schematic diagram showing the hydraulic control device of FIG. 3 in a neutral range.

Operation of the hydraulic control device 20 in the neutral range will be described based on FIG. 4B. In the neutral range, the hydraulic control device 20 performs low-pressure control in which a predetermined oil pressure is supplied to the brake B-2 in advance, in order to achieve improved response to shifting from N to R. Specifically, in the neutral range, the first switching valve 21 is in the right-half position (first state), and the second switching valve 22 is in the left-half position (fourth state).

The control pressure $P_{SL3}$ controlled to a low pressure by the linear solenoid valve 26 is therefore applied from the input port 21g of the first switching valve 21 and is output from the output port 21d to the input port 22g of the second switching valve 22 via the oil passage 46. The control pressure $P_{SL3}$ is then output from the input port 22g to the hydraulic servo 29 for the brake B-2 via the output port 22b. The low-pressure control of the brake B-2 is thus performed.

Regarding the clutch C-3 that is engaged together with the brake B-2 to form the reverse speed, the hydraulic servo 27 for the clutch C-3 communicates with the drain port 22c via the output port 21f and the input port 21e of the first switching valve 21, the oil passage 47, and the output port 22e of the second switching valve 22. The oil pressure in the hydraulic servo 27 is therefore discharged from the drain port 22c, and the clutch C-3 is disengaged. Since the check valve 23 is connected to the drain port 22c, the oil pressure in the hydraulic servo 27 for the clutch C-3 is not completely discharged at this time.

<Operation when Traveling Backward>

Figure 4C:
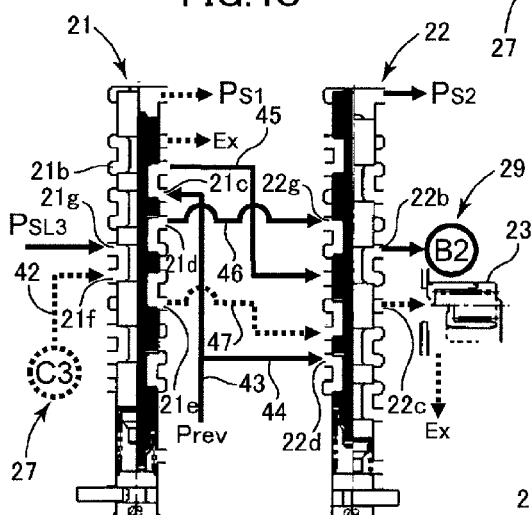
FIG. 4C is a schematic diagram showing the hydraulic control device of FIG. 3 at the time the shift range is shifted from N to R.
Figure 4D:
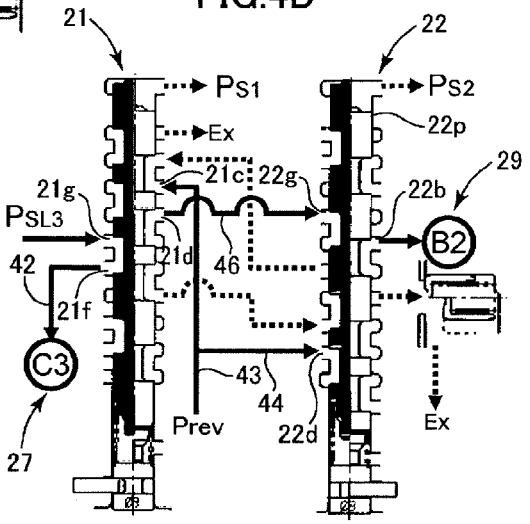
FIG. 4D is a schematic diagram showing the hydraulic control device of FIG. 3 in a reverse range.

Operation of the hydraulic control device 20 at the time the vehicle travels backward will be described based on FIG. 4D. As shown in FIG. 4D, in the R range, the first switching valve 21 is in the left-half position (second state), and the second switching valve 22 is in the left-half position (fourth state). The control pressure $P_{SL3}$ applied from the linear solenoid valve 26 to the input port 21g of the first switching valve 21 is therefore output from the output port 21f to the hydraulic servo 27 for the clutch C-3 via the oil passage 42.

The reverse range pressure $P_{rev}$ applied from the input port 21c of the first switching valve 21 is applied to the input port 22g of the second switching valve 22 via the output port 21d and the oil passage 46, and is output from the output port 22b to the hydraulic servo 29 for the brake B-2.

When the vehicle travels backward, the hydraulic control device 20 thus engages the brake B-2 by the reverse range pressure $P_{rev}$ and engages the clutch C-3 by the control pressure $P_{SL3}$ from the linear solenoid valve 26.

<Operation when Shifting from N to R>

Operation of the hydraulic control device 20 at the time the shift range is shifted from the neutral range to the reverse range will be described based on FIG. 4C. As described above, the second switching valve 22 is in the left-half position (fourth state) when in the neutral range and the reverse range. As shown in FIG. 4C, the second switching valve 22 is kept in the left-half position even when the shift range is shifted from the neutral range to the reverse range.

On the other hand, the first switching valve 21 is switched from the right-half position (first state) for the neutral range to the left-half position (second state) for the reverse range. As described above, in the neutral range, the hydraulic servo 27 for the clutch C-3 communicates with the drain port 22c of the second switching valve 22. The hydraulic servo 27 for the clutch C-3 continues to communicate with the drain port 22c until the state of the first switching valve 21 is switched. Since the second switching valve 22 is in the left-half position, the second switching valve 22 cuts off the reverse range pressure $P_{rev}$ applied from the input port 22d, namely the reverse range pressure $P_{rev}$ for ensuring that the reverse speed is formed in case of a failure.

Accordingly, for example, even if the position of the spool 21p of the first switching valve 21 is not switched quickly enough or the reverse range pressure $P_{rev}$ is generated early when the shift range is shifted from N to R, and thus the reverse range pressure $P_{rev}$ is generated when the first switching valve 21 is still in the right-half position, the reverse range pressure $P_{rev}$ is not supplied to the hydraulic servo 27 for the clutch C-3 and thus the clutch C-3 is not engaged. When the first switching valve 21 is switched to the left-half position, the clutch C-3 can be controlled and engaged by the regulated control pressure $P_{SL3}$ from the linear solenoid valve 26.

As described above, in the reverse range, the hydraulic control device 20 of the present disclosure forms the reverse range pressure $P_{rev}$ for engaging the brake B-2 in a separate system from the reverse range pressure $P_{rev}$ for ensuring that the reverse speed is formed, and supplies the reverse range pressure $P_{rev}$ for ensuring that the reverse speed is formed through the second switching valve 22. Accordingly, when the second switching valve 22 is in the right-half position (third state) where the second switching valve 22 is in the reverse inhibiting state, an ensuring circuit 44, 22d, 22e, 47, 21e, 21f, 42 is formed so that the reverse range pressure $P_{rev}$ can be supplied to the hydraulic servo 27 for the clutch C-3. However, when the second switching valve 22 is in the left-half position (fourth state), namely the position where the second switching valve 22 is located when the shift range is the N range, when the shift range is shifted from N to R, and when the shift range is the R range, this ensuring circuit can be blocked to cut off the reverse range pressure $P_{rev}$ for ensuring that the reverse speed is formed. The hydraulic servo 27 for the clutch C-3 is connected to the drain port 22c of the second switching valve 22 when the shift range is the N range and when the shift range is shifted from N to R. Accordingly, when the shift range is shifted from N to R, the reverse range pressure $P_{rev}$ is not supplied to the hydraulic servo 27 for the clutch C-3, and the clutch C3 can be controlled and engaged by the control pressure $P_{SL3}$ so as not to cause shift shock after the position of the first switching valve 21 is reliably switched.

Namely, when the shift range is shifted from N to R, the hydraulic control device 20 cuts off the reverse range pressure $P_{rev}$ received at the input port (reverse range pressure input port, first reverse range pressure input port) 22d, and allows the hydraulic servo 27 for the clutch (first friction engagement element) C-3 to communicate with the drain port 22c of the second switching valve 22. Accordingly, even if the first switching valve 21 does not respond quickly enough or the reverse range pressure $P_{rev}$ is generated earlier than switching of the position of the first switching valve 21 when the shift range is shifted from N to R, the clutch C-3 can be prevented from being engaged by the reverse range pressure $P_{rev}$, and the clutch C-3 can be controlled and engaged by the regulated control pressure.

As shown in FIG. 4A, even if the second switching valve 22 is in the right-half position (third state) where the second switching valve 22 is in the reverse inhibiting state, the first switching valve is switched to the right-half position (first state), whereby the reverse range pressure $P_{rev}$ applied from the input port (reverse range pressure input port) 22d of the second switching valve 22 can be supplied from the output port (first output port) 21f to the hydraulic servo 42 for the clutch (first friction engagement element) C-3 via the output port (fourth output port) 22e of the second switching valve 22 and the input port (first input port) 21e of the first switching valve 21. The clutch C-3 can thus be engaged even in case of a failure in which the spool 22p cannot be moved when the second switching valve 22 is in the reverse inhibiting state.

Moreover, the first switching valve 21 allows the input port (control pressure input port) 21g to communicate with the output port (second output port) 21d when in the right-half position (first state), and allows the input port (second reverse range pressure input port) 21c to communicate with the output port 21d when in the left-half position (second state). The second switching valve 22 allows the input port (third input port) 22f to communicate with the output port (third output port) 22b when in the right-half position (third state), and allows the input port (second input port) 22g to communicate with the output port (third output port) 22b when in the left-half position (fourth state). Accordingly, in the neutral range, as shown in FIG. 4B, the first switching valve 21 is in the right-half position and the second switching valve 22 is in the left-half position, whereby the control pressure $P_{SL3}$ can be supplied to the hydraulic servo 29 for the brake B-2. As shown in FIG. 4A, in case of a failure in which the spool 22p cannot be moved when the second switching valve 22 is in the reverse inhibiting state, the reverse range pressure $P_{rev}$ applied to the input port 22f can be supplied to the hydraulic servo 29 for the brake B-2. As shown in FIG. 4D, in the reverse range, the first and second switching valves 21, 22 are in the left-half position, whereby the reverse range pressure $P_{rev}$ applied to the input port 21c of the first switching valve 21 can be supplied to the hydraulic servo 29 for the brake B-2.

When the first switching valve 21 is in the right-half position (first state), the input port (second reverse range pressure input port) 21c of the first switching valve 21 communicates with the output port (fifth output port) 21b, and this output port 21b is connected to the input port (third input port) 22f of the second switching valve 22. Accordingly, in case of a failure in which the spool 22p cannot be moved when the second switching valve 22 is in the reverse inhibiting state, the reverse range pressure $P_{rev}$ can be supplied to the hydraulic servo 29 for the brake B-2 via the first switching valve 21.

Moreover, the check valve 23 that limits the flow rate of oil is connected to the drain port 22c of the second switching valve 22. Accordingly, even when the shift range is the neutral range (when the shift range is shifted from N to R) in which the hydraulic servo 27 for the clutch (first friction engagement element) is connected to the drain port 22c, the oil pressure can be prevented from being completely discharged from the hydraulic servo 27 for this clutch.

In the above embodiment, the reverse range pressure $P_{rev}$ is applied to the input port 22g of the second switching valve 22 via the first switching valve 21. However, the reverse range pressure $P_{rev}$ need not necessarily be applied to the input port 22g via the first switching valve 21. The reverse range pressure $P_{rev}$ may be applied to the input port 22g in any manner as long as the low-pressure control of the brake B-2 can be performed and it can be ensured that the reverse speed is formed. The reverse range pressure $P_{rev}$ applied to the input port 22d need only to be selectively cut off via the second switching valve 22, and need not necessarily be cut off directly by the second switching valve 22. Although the positions of the first and second switching valves 21, 22 are switched by the two on-off solenoid valves 24, 25, the present disclosure is not limited to this. For example, any configuration may be used as long as a signal pressure can be output like a linear solenoid valve.

INDUSTRIAL APPLICABILITY

The hydraulic control device for the automatic transmission of the present disclosure can be mounted on an automatic transmission for a vehicle such as an automobile.

The invention claimed is:

1. A hydraulic control device for an automatic transmission, comprising:
   a linear solenoid valve that outputs a regulated control pressure;
   a first switching valve that includes a control pressure input port to which the control pressure can be applied from the linear solenoid valve, a first input port, a first output port connected to a hydraulic servo for a first friction engagement element to be engaged to form a reverse speed, and a second output port, and that can switch between a first state where the control pressure input port communicates with the second output port and the first input port communicates with the first output port and a second state where the control pressure input port communicates with the first output port;
   a second switching valve that includes a reverse range pressure input port to which a reverse range pressure can be applied, a second input port to which the second output port is connected, a third output port connected to a hydraulic servo for a second friction engagement element to be engaged together with the first friction engagement element to form the reverse speed, and a fourth output port connected to the first input port, and that can switch between a third state where the reverse range pressure input port communicates with the fourth output port and a fourth state where the second input port communicates with the third output port;
   a first switcher teller that switches the state of the first switching valve; and
   a second switcher that switches the state of the second switching valve, wherein
   when the first switching valve is switched to the first state while the second switching valve is in the third state, the reverse range pressure applied from the reverse range pressure input port of the second switching valve can be supplied from the first output port to the hydraulic servo for the first friction engagement element via the fourth output port of the second switching valve and the first input port of the first switching valve, and
   when a shift range is shifted from a neutral range to a reverse range, the second switching valve is in the fourth state, and the first switching valve is switched from the first state to the second state, so that the reverse range pressure applied to the reverse range pressure input port is cut off by the second switching valve.

2. The hydraulic control device for an automatic transmission according to claim 1, wherein
   the second switching valve includes a drain port that discharges an oil pressure, and allows the fourth output port to communicate with the drain port when in the fourth state, and
   when the shift range is shifted from the neutral range to the reverse range, the second switching valve is in the fourth state, and the hydraulic servo for the first friction engagement element continues to be connected to the drain port until the first switching valve is switched from the first state to the second state.

3. The hydraulic control device for an automatic transmission according to claim 2, wherein
   the reverse range pressure input port of the second switching valve is a first reverse range pressure input port,
   the first switching valve has a second reverse range pressure input port to which the reverse range pressure can be applied, and the second reverse range pressure input port communicates with the second output port when in the second state, and
   the second switching valve has a third input port to which the reverse range pressure can be applied, and the third input port communicates with the third output port when in the third state.

4. The hydraulic control device for an automatic transmission according to claim 3, wherein
   the first switching valve has a fifth output port that communicates with the second reverse range pressure input port when in the first state, and
   the third input port of the second switching valve is connected to the fifth output port of the first switching valve.

5. The hydraulic control device for an automatic transmission according to claim 4, wherein
   the second switching valve blocks communication between the second input port and the third output port when switched to the third state, and cuts off supply of an oil pressure to the hydraulic servo for the second friction engagement element when switched to the third state while the first switching valve is in the second state.

6. The hydraulic control device for an automatic transmission according to claim 5, wherein
when the second switching valve is in the third state and the first switching valve is in the first state, the reverse range pressure applied to the second reverse range pressure input port is supplied to the hydraulic servo for the second friction engagement element via the fifth output port of the first switching valve and the third input port and the third output port of the second switching valve, and the reverse range pressure applied to the first reverse range pressure input port is supplied to the hydraulic servo for the first friction engagement element via the fourth output port of the second switching valve and the first input port and the first output port of the first switching valve.

7. The hydraulic control device for an automatic transmission according to claim 6, further comprising:
a flow rate limiter that is connected to the drain port to limit a flow rate of oil that is discharged from the drain port.

8. The hydraulic control device for an automatic transmission according to claim 1, wherein
the reverse range pressure input port of the second switching valve is a first reverse range pressure input port,
the first switching valve has a second reverse range pressure input port to which the reverse range pressure can be applied, and the second reverse range pressure input port communicates with the second output port when in the second state, and
the second switching valve has a third input port to which the reverse range pressure can be applied, and the third input port communicates with the third output port when in the third state.

9. The hydraulic control device for an automatic transmission according to claim 8, wherein
the first switching valve has a fifth output port that communicates with the second reverse range pressure input port when in the first state, and
the third input port of the second switching valve is connected to the fifth output port of the first switching valve.

10. The hydraulic control device for an automatic transmission according to claim 9, wherein
the second switching valve blocks communication between the second input port and the third output port when switched to the third state, and cuts off supply of an oil pressure to the hydraulic servo for the second friction engagement element when switched to the third state while the first switching valve is in the second state.

11. The hydraulic control device for an automatic transmission according to claim 9, wherein
when the second switching valve is in the third state and the first switching valve is in the first state, the reverse range pressure applied to the second reverse range pressure input port is supplied to the hydraulic servo for the second friction engagement element via the fifth output port of the first switching valve and the third input port and the third output port of the second switching valve, and the reverse range pressure applied to the first reverse range pressure input port is supplied to the hydraulic servo for the first friction engagement element via the fourth output port of the second switching valve and the first input port and the first output port of the first switching valve.

12. The hydraulic control device for an automatic transmission according to claim 1, further comprising:
a flow rate limiter that is connected to the drain port to limit a flow rate of oil that is discharged from the drain port.

* * * * *